May 11, 1965   G. W. LEAVESLEY, JR   3,183,289
METHOD OF MAKING A POSITIVE FACE VACUUM FORMING MOLD
Filed Dec. 15, 1961
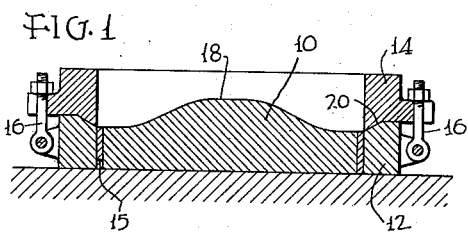
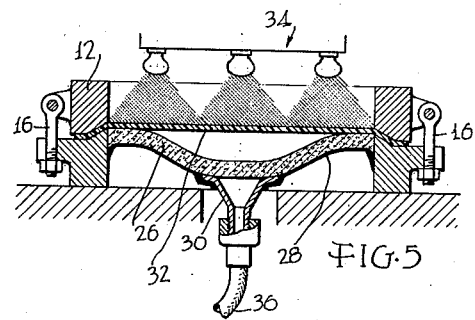
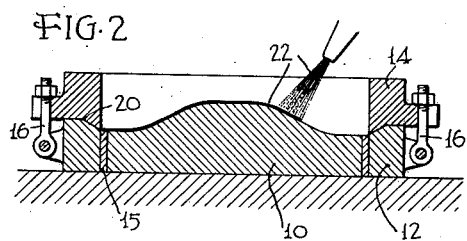
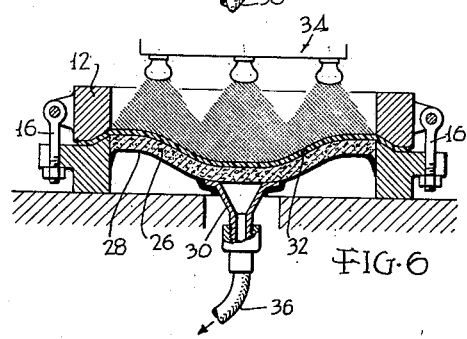
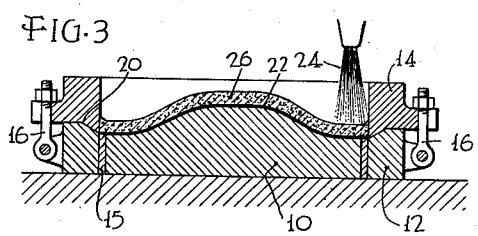
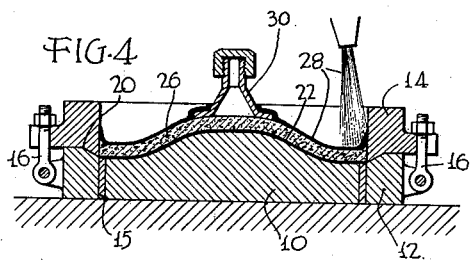
INVENTOR.
George W. Leavesley Jr.
BY John B. Sowell
ATTORNEY

United States Patent Office 3,183,289
Patented May 11, 1965

3,183,289
METHOD OF MAKING A POSITIVE FACE VACUUM FORMING MOLD
George W. Leavesley, Jr., Levittown, Pa., assignor to The Budd Company, Philadelphia, Pa., a corporation of Pennsylvania
Filed Dec. 15, 1961, Ser. No. 159,505
2 Claims. (Cl. 264—220)

This invention relates to a process for producing metal molds employed in the vacuum molding of thermoplastic sheets, and more particularly to an improved vacuum mold structure.

Heretofore, the general method of making a vacuum mold for forming thermoplastic materials such as cellulose acetate, cellulose acetate butyrate, rigid vinyl polystyrene, polyethylene and polycarbonates is to force a heated sheet of the thermoplastic material into close contact with the pattern or mold. Vacuum molds or patterns are preferably made of metal having a smooth finish but other heat resistant materials have been employed to reduce the cost of the mold. The disadvantage of molds presently employed concerns the vacuum holes in the mold or pattern. When the heated sheet is drawn into contact with the mold, the formed sheet is also drawn into the vacuum holes leaving imperfections on the sheet. It is desirable to make a heat resistance vacuum mold which has a porous surface so fine that no imperfections will be left on the formed thermoplastic sheet.

It is a primary object of this invention to produce a porous mold structure having a working surface which is substantially smooth.

It is another object of this invention to produce a vacuum mold structure which eliminates the necessity for casting, drilling, and hand finishing the metal mold.

It is a further object of this invention to produce a vacuum molding structure which eliminates the requirement of vacuum chambers.

It is another object of this invention to provide an improved method of vacuum molding thermoplastic sheet materials.

Other and more specific objects of the present invention will become apparent in the following detailed description of a preferred embodiment of the vacuum mold means illustrated in the accompanying drawings wherein:

FIG. 1 is a cross-sectional elevation of a male pattern in a frame box;

FIG. 2 is a cross-sectional elevation of the male pattern of FIG. 1 being coated with a spray solution of a parting compound;

FIG. 3 is a cross-sectional elevation of the male pattern of FIG. 2 being sprayed with molten metal;

FIG. 4 is a cross-sectional elevation of the male pattern of FIG. 3 being further coated with a spray coating of plastic sealer;

FIG. 5 is a cross-sectional elevation of the assembly of FIG. 4 having the male pattern removed and a sheet of thermoplastic material clamped in the frame boxes;

FIG. 6 is a cross-sectional elevation of the assembly of FIG. 5 illustrating the manner in which the thermoplastic material is finished.

In accordance with the invention a preferred method of making the vacuum molding structure is to make a surface impression pattern of the surface to be formed, to surround the pattern with a lower frame box and affix an upper frame box to the lower frame box leaving the working surface of the pattern exposed, to spray the surface of said pattern with a very thin coating of parting compound, to spray the coated surface of said pattern with molten metal depositing a rigid porous shell structure over the working surface of the pattern, to apply a hollow fitting to the rear surface of the porous shell structure, to applying a thermosetting plastic on the rear surface of said porous shell structure interlocking said upper frame box and said fitting with said porous shell structure, and removing the lower frame box and male pattern from said porous metal structure.

Referring now to the drawings where the pattern 10 is shown surrounded by the hollow lower frame box 12 which is held in rigid engagement with an upper frame box 14 by means of conventional swing bolts 16. It is understood that the surface 18 of the pattern 10 may be hand formed to a desired contour or may be cast from a contoured surface. Alternatively the surface 18 may be a thin shell which has a hardenable backing material inserted in the rear cavity to provide a rigid solid three-dimensional pattern. The pattern 10 may be smaller than the frame box 12 and it is only necessary that some suitable filler 15 such as plaster of Paris or asbestos packing be applied between the edges of the pattern 10 and the lower frame box 12. The frame boxes may be made of wood or other material of similar strength which is easily fabricated to the approximate size of the surface 18. The ledge or lip 20 of the frame boxes may be any desired contour, preferably one which will facilitate a locking and locating action between the frame boxes.

As shown in FIG. 2 the edges of the pattern 10 have been built out to the ledge 20 of the frame boxes 12 and 14. A parting compound 22 is applied to the working surface 18 of the pattern 10. An aqueous solution of colloidal graphite may be employed for this purpose. When large porous shells are to be made it is preferred that the parting compound have adhesive properties and the shell may be removed by applying a release agent through the porous shell. Applied on the top of the parting compound is a spray deposit of molten metal. This deposit of molten metal is preferably applied when the metal is in the form of a slush at a temperature slightly above the melting point of the metal. If the temperature of the molten metal is raised considerably above the melting point of the metal the metal shell 26 which is deposited may be completely homogeneous and non-porous the same as if the metal was cast. The shown preferred method of forming the porous metal shell 26 is to apply the molten metal 24 in a series of very fine layers allowing each preceding layer to cool sufficiently to avoid any appreciable heat build-up in the shell, thus, insuring that the shell 26 will be porous and also prevent the shell from distorting due to thermal expansion. Porous shells may be made by gas depositing or sintering, but require a number of extra steps.

Spraying the shell 26 on the pattern 10 also causes it to lock to the sides of the upper frame box 14 but permits separation from the lower frame box 12. To insure a locking action between the upper frame box 14 and the porous metal shell 26 a plastic such as epoxy resin may be applied at the juncture of the shell and the frame box 14. The upper frame box 14 and metal shell 26 may be removed from the pattern 10 and separated from lower frame box 12. The frame encased mold may be used in vacuum molding machines without further alteration. To avoid the additional expense of vacuum molding machines a coating 28 of any suitable self-hardening plastic or sealer may be applied to the back surface of the rigid shell 26. As shown in FIG. 4 a hollow fitting 30 may also be attached to the rear surface of the shell by the coating 28. When the coating 28 has hardened the frame box 14 and shell 26 act as a vacuum molding structure which is ready for use without any further modification. The frame box 12 or a similarly constructed frame box may be used as a clamp retainer to retain a sheet of thermoplastic material set over the vacuum molding structure. Infrared lamps 34 or other heating devices may be applied to heat the sheet 32. A connection 36 leading to a vacuum pump (not shown) may be attached to the fitting 30 to cause the sheet 32 as it is heated to be formed over the working surface of the porous metal shell.

When the porous metal shell 26 is made from a low temperature metal such as tin, zinc, lead, etc., it may be sprayed over many suitable set hardening materials or over a wooden pattern without any harm to the surface of the pattern. The porous metal structure of the shell permits the application of a vacuum at any point on the rear surface of the shell to distribute a uniform and equalized pressure over the entire working surface of the shell.

The porous metal shell herein described was found to have a number of advantages over the prior art devices. Vacuum holes may be made as small as .02 inch in diameter on a flat surface but it is extremely difficult to produce vacuum holes of this size on a contoured surface. The working surface of the porous metal shell is so smooth that the porous structure cannot be observed by the human eye. Once the porous metal shell structure is constructed no additional expensive equipment is required to form objects from thermoplastic sheet materials.

It is apparent that many modifications and variations of this invention as hereinbefore set forth may be made without departing from the spirit and scope thereof; the specific embodiments described are given by way of example only and the invention is limited only by the terms of the appended claims.

What is claimed is:

1. The method of making a positive face vacuum forming mold from a negative pattern consisting essentially of the steps:

placing said negative pattern in a lower frame box with its front face exposed, coating the front face of said negative pattern with a parting agent, placing an upper frame box on said lower frame box, spraying a plurality of layers of porous deposited spray metal on said pattern to form a porous shell on the front face of said pattern and simultaneously bonding said porous shell to said upper frame box, covering a small area of the rear surface of said porous shell with a hollow outlet fixture, applying a self-hardening non-porous sealer over the rear surface of said porous shell to simultaneously interconnect said hollow outlet fixture with said porous shell and to simultaneously interconnect said upper frame box with said sealer, and removing said porous shell, said sealer, said upper frame box and said hollow outlet as an intergral positive face vacuum forming mold from said negative pattern and said lower frame box.

2. The method of making a positive face vacuum forming mold from a negative pattern consisting essentially of the steps:

placing an upper frame box around the perimeter of a negative pattern leaving its front face exposed, coating the front face of said negative pattern with a parting agent, spraying a plurality of layers of porous deposited spray metal on said pattern to form a porous shell on the front face of said pattern, covering a small area of the rear surface of said porous shell with a hollow outlet fixture, applying a hardenable non-porous sealer over the rear surface of said porous shell to simultaneously interconnect said hollow outlet fixture with said porous shell and to simultaneously interconnect said upper frame box with said shell, and removing said porous shell integral with said frame box and said outlet from said negative pattern to provide a positive face vacuum forming mold.

References Cited by the Examiner

UNITED STATES PATENTS

| | | | |
|---|---|---|---|
| 1,592,536 | 7/26 | O'Neil | 18—47 XR |
| 2,233,174 | 2/41 | Braund | 18—19 |
| 2,493,439 | 1/50 | McDonald | 18—19 |
| 2,629,907 | 3/53 | Hugger | 22—200 |
| 2,652,595 | 9/53 | Kish | 18—47.5 |
| 2,704,238 | 3/55 | Ushakoff. | |
| 2,982,996 | 5/61 | Brucker | 18—47 |
| 3,024,506 | 3/62 | Tremble | 22—193 |
| 3,035,318 | 5/62 | Campbell | 22—200 |

ROBERT F. WHITE, *Primary Examiner.*

WILLIAM J. STEPHENSON, *Examiner.*